United States Patent
Chester

(10) Patent No.: US 11,084,514 B2
(45) Date of Patent: Aug. 10, 2021

(54) SEMIPERMANENT WHEELBARROW ENCLOSURE

(71) Applicant: Toolspace Pty Ltd, Garbutt (AU)

(72) Inventor: Jason Chester, Mount Low (AU)

(73) Assignee: TOOLSPACE PTY LTD, Garbutt (AU)

( * ) Notice: Subject to any disclaimer, the term of this patent is extended or adjusted under 35 U.S.C. 154(b) by 479 days.

(21) Appl. No.: 16/207,606

(22) Filed: Dec. 3, 2018

(65) Prior Publication Data

US 2020/0114945 A1 Apr. 16, 2020

(30) Foreign Application Priority Data

Oct. 16, 2018 (AU) .................................. 2018903899

(51) Int. Cl.
*B62B 1/20* (2006.01)
*B62B 5/00* (2006.01)

(52) U.S. Cl.
CPC ............ *B62B 5/0013* (2013.01); *B62B 1/204* (2013.01)

(58) Field of Classification Search
CPC .......... B62B 1/20; B62B 1/204; B62B 5/0013
See application file for complete search history.

(56) References Cited

U.S. PATENT DOCUMENTS

| | | | | |
|---|---|---|---|---|
| 5,374,095 A * | 12/1994 | Ramseth | ................... | B62B 1/20 280/47.18 |
| 5,622,266 A * | 4/1997 | Curtis | ..................... | B07B 1/005 209/235 |
| 6,547,309 B1 * | 4/2003 | Franklin | ................... | B62B 1/20 280/47.31 |
| 7,086,557 B2 * | 8/2006 | Miller | ...................... | B65F 1/16 220/836 |
| 7,562,898 B2 * | 7/2009 | Hand | ...................... | B25H 3/02 280/47.18 |
| 7,988,181 B2 * | 8/2011 | Hand | ...................... | B25H 3/02 280/653 |
| 8,091,815 B2 * | 1/2012 | Tardif | ..................... | B62B 1/204 241/100 |
| 8,479,949 B2 * | 7/2013 | Henkel | ................. | B65F 1/1615 220/835 |

(Continued)

*Primary Examiner* — Katy M Ebner
(74) *Attorney, Agent, or Firm* — Innovation Capital Law Group, LLP; Vic Lin

(57) ABSTRACT

A semipermanent enclosure for a wheelbarrow is used to allow building contractors, installers and the like, some of which already have wheelbarrows, to affix the enclosure to the wheelbarrow in a convenient manner for use as a semi-secure storage box which may be left on site and accessed relatively easily. The enclosure has a plastic body having a dome portion surrounded by a wheelbarrow edge engaging periphery portion. The dome portion rises upwardly from the periphery portion so as to increase storage space there underneath, especially for tools, equipment and the like piled above the edge of the wheelbarrow. The periphery may comprise a forward engagement which locks under the front edge of the wheelbarrow rim and which are secured at a rear thereof using fasteners penetrating the periphery and the adjacent rim of the wheelbarrow. The periphery may be sized and shaped to suit most commercial wheelbarrow rim sizings.

18 Claims, 6 Drawing Sheets

(56) References Cited

U.S. PATENT DOCUMENTS

| | | | | |
|---|---|---|---|---|
| 8,517,402 | B2* | 8/2013 | Davis | B65F 1/1415 |
| | | | | 280/47.31 |
| 8,997,658 | B2* | 4/2015 | Pipkorn | B62B 5/0013 |
| | | | | 108/42 |
| 9,352,359 | B2* | 5/2016 | Lamjav | B07B 1/46 |
| D787,609 | S | 5/2017 | Desberg | |
| 9,821,830 | B1* | 11/2017 | Matlock | B62B 1/20 |
| D807,438 | S | 1/2018 | Desberg | |
| D814,137 | S* | 3/2018 | Linto | D34/27 |
| 10,167,006 | B2* | 1/2019 | Lennon | A44B 99/00 |
| 10,220,505 | B2* | 3/2019 | Thorsen | B62B 1/22 |
| 10,433,637 | B1* | 10/2019 | Englestead | A47B 5/06 |
| 10,571,129 | B2* | 2/2020 | Kodila | F24B 3/00 |
| 10,582,819 | B2* | 3/2020 | Sickler | A47L 5/365 |
| 10,800,437 | B2* | 10/2020 | Paino | B62B 1/22 |
| D917,819 | S* | 4/2021 | Chester | D34/16 |
| 2005/0212238 | A1* | 9/2005 | Conley | B25H 1/04 |
| | | | | 280/47.32 |
| 2007/0164526 | A1* | 7/2007 | Martini | B62B 1/24 |
| | | | | 280/47.26 |
| 2013/0056397 | A1* | 3/2013 | Geller | B07B 1/46 |
| | | | | 209/352 |
| 2015/0040948 | A1* | 2/2015 | Sickler | B62B 1/204 |
| | | | | 134/21 |
| 2015/0291078 | A1* | 10/2015 | Carrillo, Jr. | B60P 3/426 |
| | | | | 296/100.02 |
| 2019/0045986 | A1* | 2/2019 | Anderson | A47L 9/00 |
| 2019/0380534 | A1* | 12/2019 | Patterson | A47J 37/0763 |
| 2020/0114945 | A1* | 4/2020 | Chester | B62B 5/0013 |

* cited by examiner

SEMIPERMANENT WHEELBARROW ENCLOSURE

FIELD OF THE INVENTION

This invention relates generally to semipermanent wheelbarrow enclosure which may be used to convert a wheelbarrow into a semi-secure storage box for convenient on-site storage of tools and equipment.

BACKGROUND OF THE INVENTION

Builders contractors, installers and the like perform work on various sites, taking along their tools of the trade.

For extended projects, especially for building construction, contractors may either remove their tools from site which is inconvenient or leave their tools on-site which may be however be exposed to borrowing or theft. Exposed construction sites may also expose tools to damage from rain.

The present invention seeks to provide a way overcome or substantially ameliorate at least some of these deficiencies, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a semipermanent enclosure for a wheelbarrow. The present enclosure is configured to allow building contractors, installers and the like, some of which already have wheelbarrows, to affix the enclosure to the wheelbarrow in a convenient manner for use as a semi-secure storage box which may be left on site and accessed relatively easily.

The present enclosure has a plastic body having a dome portion surrounded by a wheelbarrow edge engaging periphery portion. The dome portion rises upwardly from the periphery portion so as to increase storage space there underneath, especially for tools, equipment and the like piled above the edge of the wheelbarrow. In a preferred embodiment, the dome portion allows at least 200 mm above the edge of the wheelbarrow.

The periphery is configured so as to engage most, if not all commercial types of wheelbarrows in that the periphery has a rear, sides and a front wherein the rear and sides are straight and the front covers around the front of the body such that the periphery conforms substantially thereto. We found that edges of commercially available wheelbarrows typically vary in width by approximately 5 to 10 mm and a length by up to 50 mm.

As such, the periphery may comprise a horizontal periphery portion and a vertical periphery portion thereabout. The horizontal periphery portion may comprise a width of greater than 30 mm or approximately 50 mm in a preferred embodiment. As such, the horizontal periphery portion allows for sizing tolerance of commercially available wheelbarrows.

Furthermore, the periphery is configured for convenient semipermanent affixation to the edge of the wheelbarrow in comprising an engagement at a front thereof which extends rearwardly. In use, the periphery is placed atop the front of the wheelbarrow such that the engagement engages under the front edge of the wheelbarrow. The rear of the enclosure may then be lowered to lie flat across the edge of the wheelbarrow.

Thereafter, the rear of the enclosure may be secured by way of fasteners driven through the periphery into the wheelbarrow edge, such as using self tapping plastic screws, bolts or the like. Fasteners may be driven vertically through the horizontal periphery portion or horizontally through the vertical periphery portion into the adjacent edge of the wheelbarrow.

Furthermore, the front periphery engagement allows the enclosure to accommodate the typically larger variance of length of commercial wheelbarrows which may, in cases be up to 50 mm as outlined above. In this way, the enclosure may be engaged to the front the wheelbarrow to engage the periphery engagement tightly under the front edge of the wheelbarrow thereby allowing the rear of the enclosure to be secured by fasteners at the respective offset, thereby providing a secure fastening irrespective of the variation of the length of the wheelbarrow. In embodiments, the rear horizontal periphery portion of the body may widen to approximately 70 mm (as opposed to, for example, approximately 50 mm at the front) so as to allow for length variation sizing tolerance such that the rear horizontal periphery portion lies across the rear edge of most commercially available wheelbarrows.

The access aperture may be relatively large and accommodated within a planar roof of the plastic body atop the dome portion. The access aperture may be substantially rectangular comprising a relatively large width and length of approximately 400 mm or more.

Furthermore, the lid may be conveniently pivotally fastened to the planar roof so as to allow for the opening and closing thereof in a convenient pivotal manner. The lid may be coupled to the roof portion towards the front of the enclosure such that the lid may be opened from the rear of the enclosure, such as when standing between the handles of the wheelbarrow. In this regard, the enclosure may be located more towards the rear of the roof, thereby easing access thereto yet also allowing for the pivotal engagement members atop the roof portion in front.

The lid may be locked using locking tabs of the roof portion of the lid having apertures which collocate when closed for the insertion of a padlock therethrough or the like.

The access aperture may comprise an inner rim which is surrounded by a corresponding outer rim of the lid so as to prevent ingress of rain. Furthermore, the covering of the edges of the wheelbarrow by the periphery prevent ingress of rain by the edges of the wheelbarrow.

According to one aspect, there is provided a semipermanent wheelbarrow enclosure having a plastic body having a dome portion and a wheelbarrow edge engaging periphery portion thereabout, the periphery having a rear, front and sides therebetween, the rear and sides being straight and the front being curved, the dome portion having an access aperture thereatop and a lid for selectively closing the aperture.

The dome portion may rise from the periphery by more than 150 mm.

The enclosure may further comprise a downwardly extending engagement at the front of the periphery which further extends rearwardly so as to engage under a front portion of a wheelbarrow edge in use.

The periphery may comprise a horizontal periphery portion and an outer vertical periphery portion and wherein the engagement extends from the lower edge of the vertical periphery portion.

The horizontal periphery portion at a rear of the enclosure may have a width greater than 50 mm.

The engagement extends vertically downwardly from the lower edge of the vertical periphery portion before transitioning horizontally.

A rear edge of the engagement may be curved.

The periphery may comprise a horizontal periphery portion and a vertical periphery portion thereabout.

The horizontal periphery portion may comprise a width greater than 30 mm.

The horizontal periphery portion may comprise a rear having a width greater than 50 mm.

The dome portion may have a planar roof and wherein the access aperture may be located through the planar roof.

The access aperture may be substantially rectangular having a width of greater than 400 mm and a length of greater than 400 mm.

The access aperture may be located towards a rear of the enclosure and wherein the access aperture may be located less than 250 mm from the rear of the enclosure.

The access aperture may be located less than 200 mm from the rear of the enclosure.

The lid may be pivotally engaged to the roof.

The rim may comprise a pair of tabs having apertures which correspond with pivot arms and corresponding apertures of the lid for pivotable engagement of the lid to the roof.

The tabs may be located in front of the access aperture.

The rear further may comprise a locking tab and aperture corresponding to a locking tab and aperture of the lid for the insertion of a lock therethrough in use.

The access aperture may have a peripheral inner upwardly extending rim thereabout and wherein the lid defines a corresponding outer downwardly extending rim.

According to another aspect, there is provided a method of enclosing a wheelbarrow using the enclosure, the method comprising engaging the enclosure under a front edge of the wheelbarrow and lowering the rear of the enclosure across the edge of the wheelbarrow and driving at least one fastener through the periphery into the edge of the wheelbarrow.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
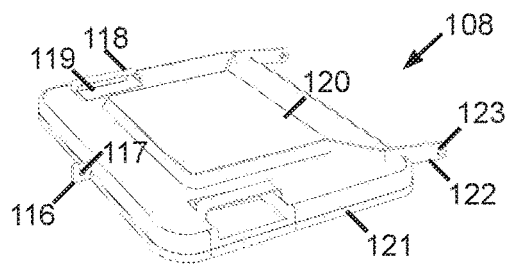
FIG. 1 shows a lid of a semipermanent wheelbarrow enclosure in accordance with an embodiment.
Figure 2:
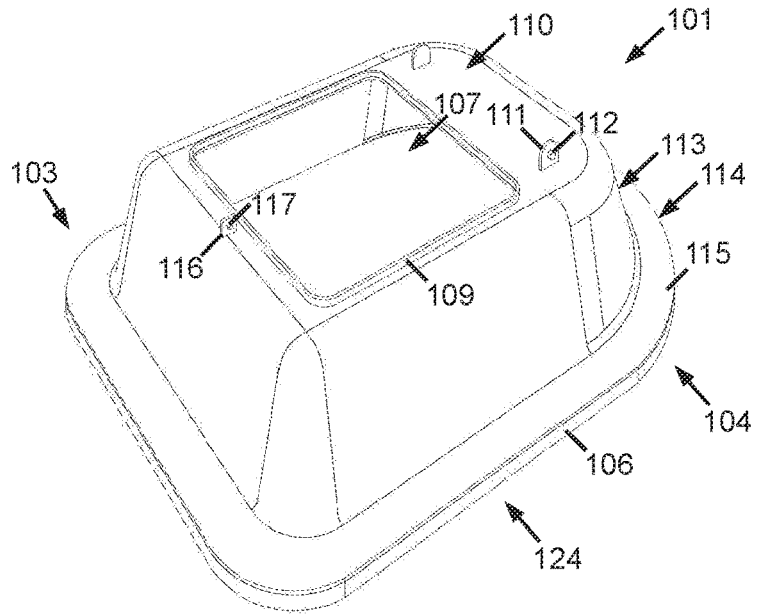
FIG. 2 shows a plastic body of a wheelbarrow enclosure in accordance with an embodiment.
Figure 3:
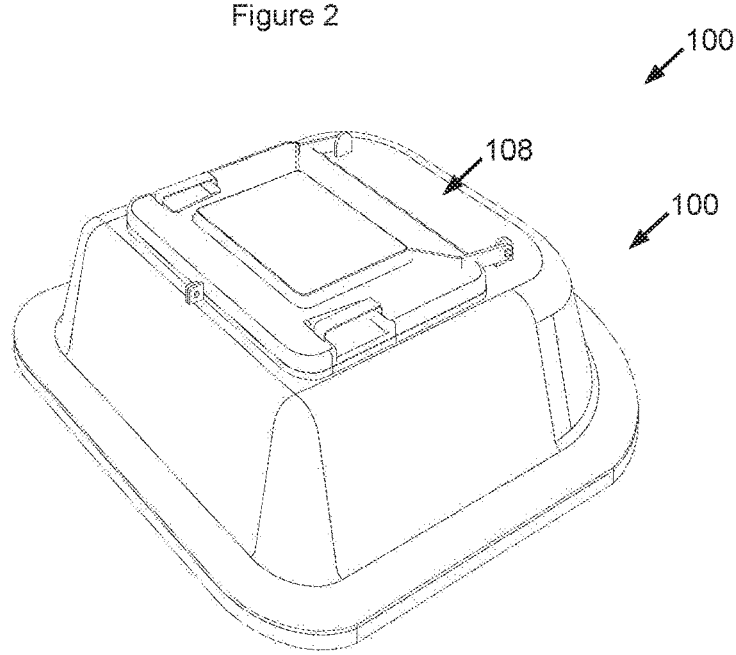
FIG. 3 illustrates the lid of FIG. 1 engaging the plastic body of FIG. 2.

FIGS. 1-3 show a semipermanent wheelbarrow enclosure 100 having a plastic body 101 and a lid 108.

The plastic body 101 may be manufactured integrally such as from rotational, injection moulding or the like.

The body 101 has a dome portion 113 and a wheelbarrow edge engaging periphery portion 114 thereabout for engaging an edge 126 of a wheelbarrow 127 in use.

Figure 10:
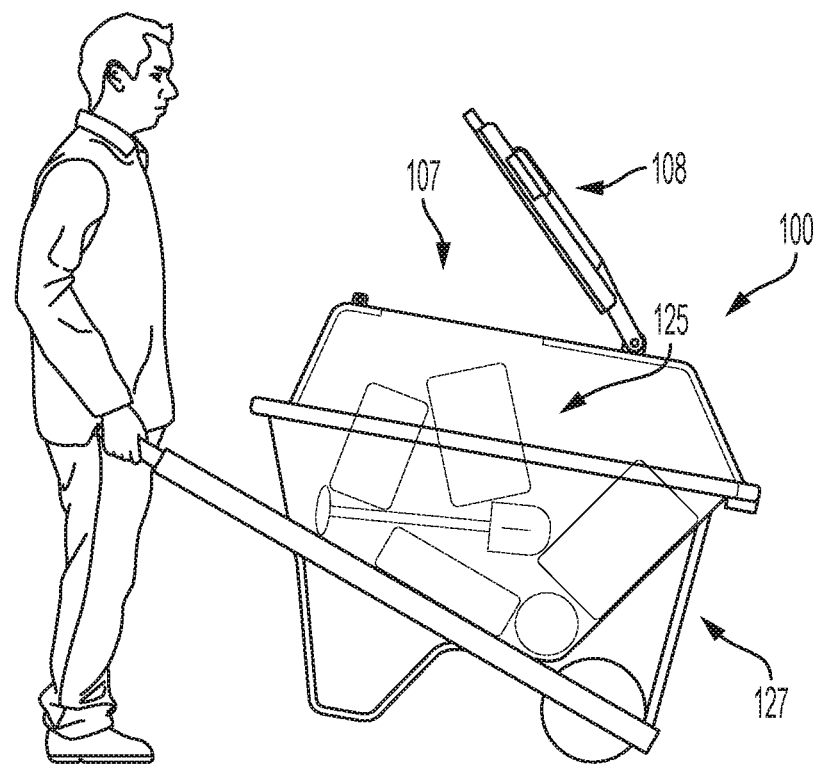
FIG. 10 illustrates the use of the enclosure for the semi-secure storage of items therein including the ergonomic access thereof via a rearward access hatch when standing between the handles of the wheelbarrow.

The dome portion 113 rises within and from the periphery 114 so as to allow accommodation thereunderneath including for the piled storage of objects 125 above the wheelbarrow edge in use in the manner shown in FIG. 10. With reference to the exemplary dimensions of FIG. 6, the dome may have an elevation of approximately 200 mm.

The periphery 114 has a rear 103, front 104 and sides 124. The rear 103 and sides 124 are preferably straight whereas the front 104 is rounded as is especially illustrated in FIG. 4 such that the periphery 114 conforms to conventional wheelbarrow edges when placed thereatop in the manner illustrated in FIG. 8.

Figure 6:
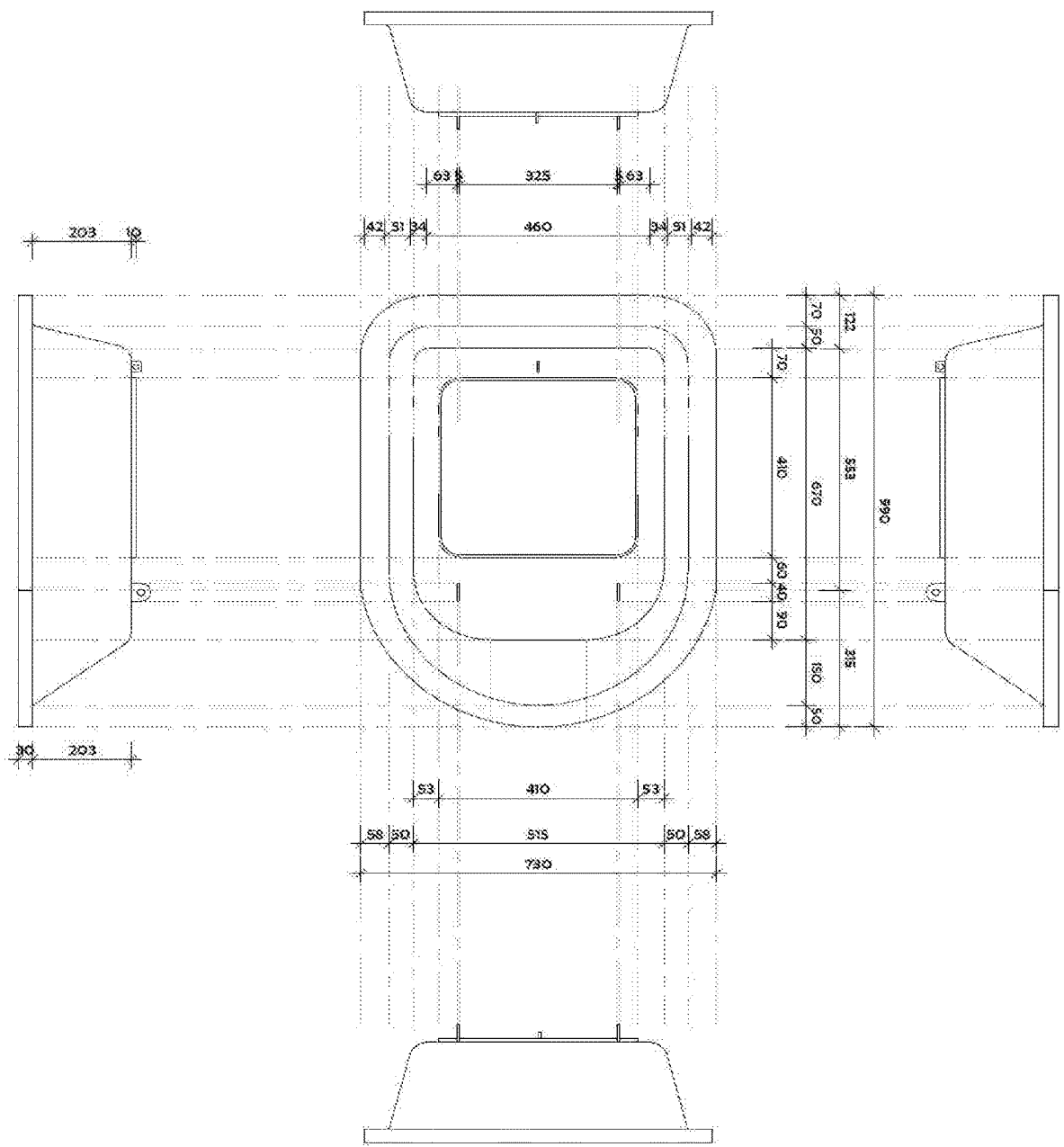
FIG. 6 illustrates exemplary dimensions of the plastic body of the enclosure in accordance with a preferred embodiment.

The dome portion 113 raises to a roof portion 110 which, may be planar in embodiments as shown. The roof portion 110 may have an access aperture 107 therein which is selectively enclosed by way of the lid 108. With reference FIG. 6, the access aperture 107 may be located towards the rear 103 of the enclosure so as to facilitate access therethrough when standing behind the wheelbarrow in use, between the handles thereof in the manner shown in FIG. 10. As is illustrated in FIG. 6, the rear edge of the access aperture 107 may be approximately 190 mm from the rear of the enclosure 100.

As such, the user may push the wheelbarrow 127 from the handles thereof and access the interior of the enclosure 100 via the rearwardly located access aperture 107 from the same position.

The dome portion 113 may conform in cross-section with the cross-sectional profile of the periphery 114 in that the rear and sides of the cross-section of the dome portion 113 may be substantially straight whereas the front cross-section of the dome portion 113 may be similarly rounded. The dome portion 113 may taper upwardly including for allowing for stacking of the plastic body 110 with other adjacent plastic bodies 110.

The periphery 114 may comprise a vertical periphery portion 106 and a horizontal periphery portion 115.

Figure 4:
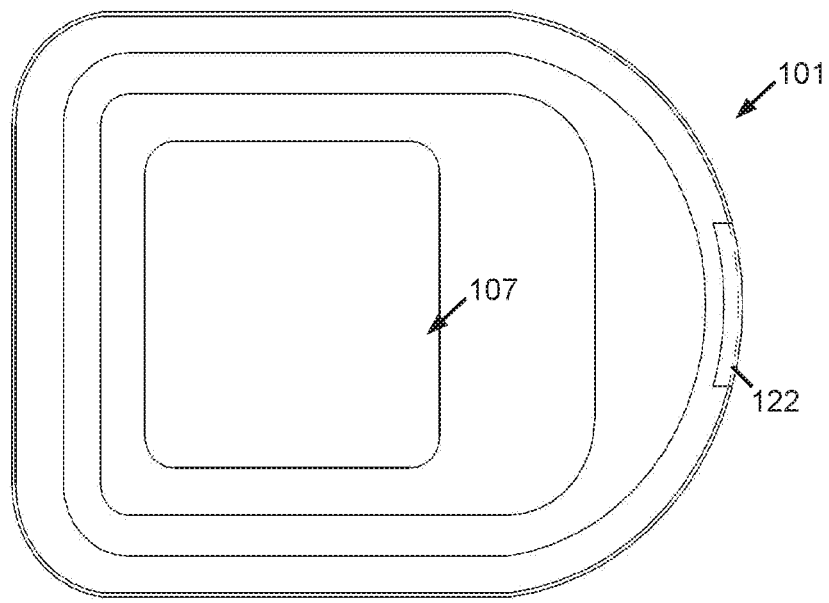
FIG. 4 illustrates an underside view of the plastic body of the enclosure.
Figure 5:
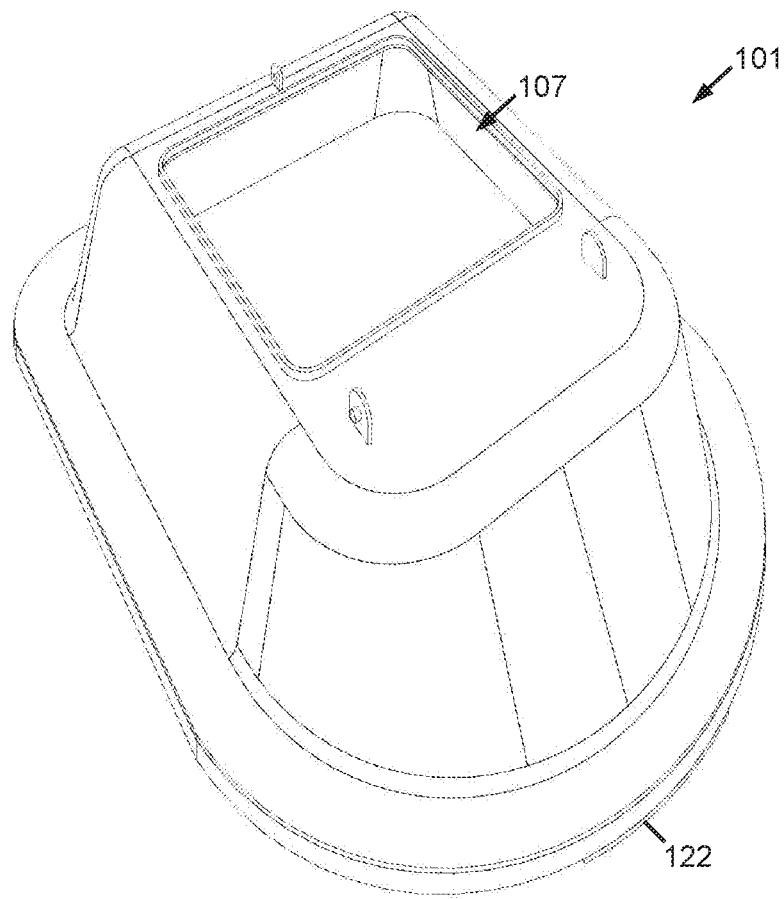
FIG. 5 illustrates a top perspective view of the plastic body of the enclosure.
Figure 8:
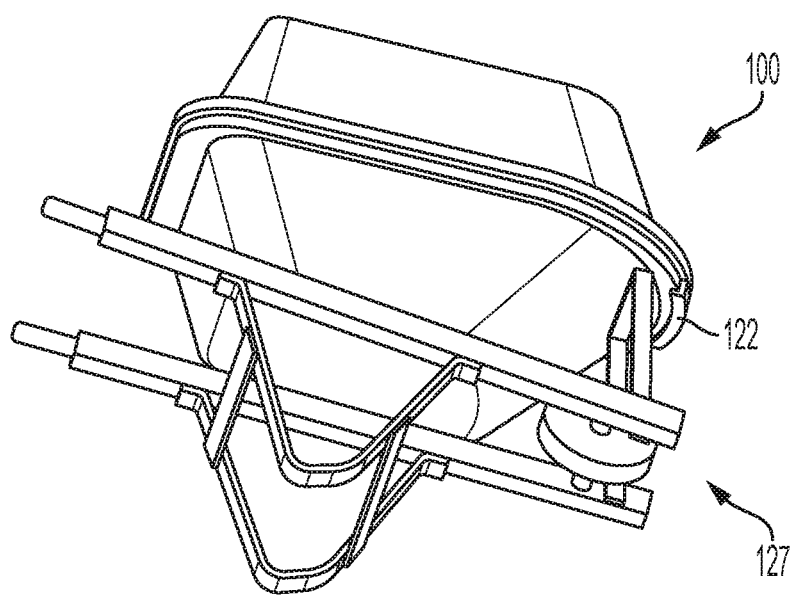
FIG. 8 illustrates a bottom perspective view of the manner of engagement of the enclosure to the conventionally available wheelbarrow.

With reference to FIGS. 4, 5 and 8, the front of the periphery 114 may comprise an under edge engagement 122 portion which extends rearwardly from the front of the periphery 114. The engagement 122 may extend from the vertical portion 106 of the periphery 114. In embodiments, the engagement 122 extends horizontally from the lower edge of the vertical portion 106. However, with reference to FIG. 5, the engagement 122 may extend downward vertically before transitioning horizontally, so as to allow a greater gap between the horizontal portion thereof and the horizontal periphery portion 115 thereatop.

Figure 7:
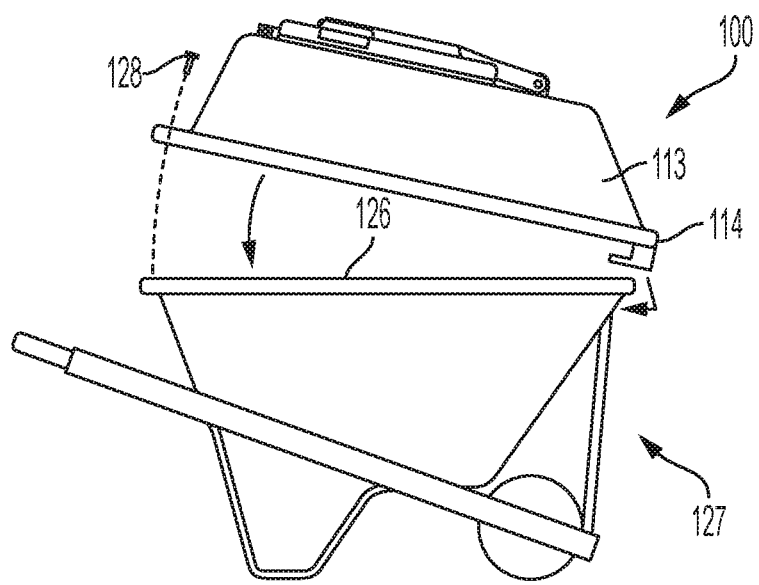
FIG. 7 illustrates the engagement of the enclosure to a conventionally available wheelbarrow in accordance an embodiment.

For securement of the plastic body 110 to the wheelbarrow, the plastic body 110 may be placed such that the engagement portion 122 engages under the front edge of the wheelbarrow and the rear 103 thereof may then be lowered such that the horizontal periphery portion 115 lies flush atop the edge of the wheelbarrow in the manner illustrated in FIG. 7.

Figure 11:
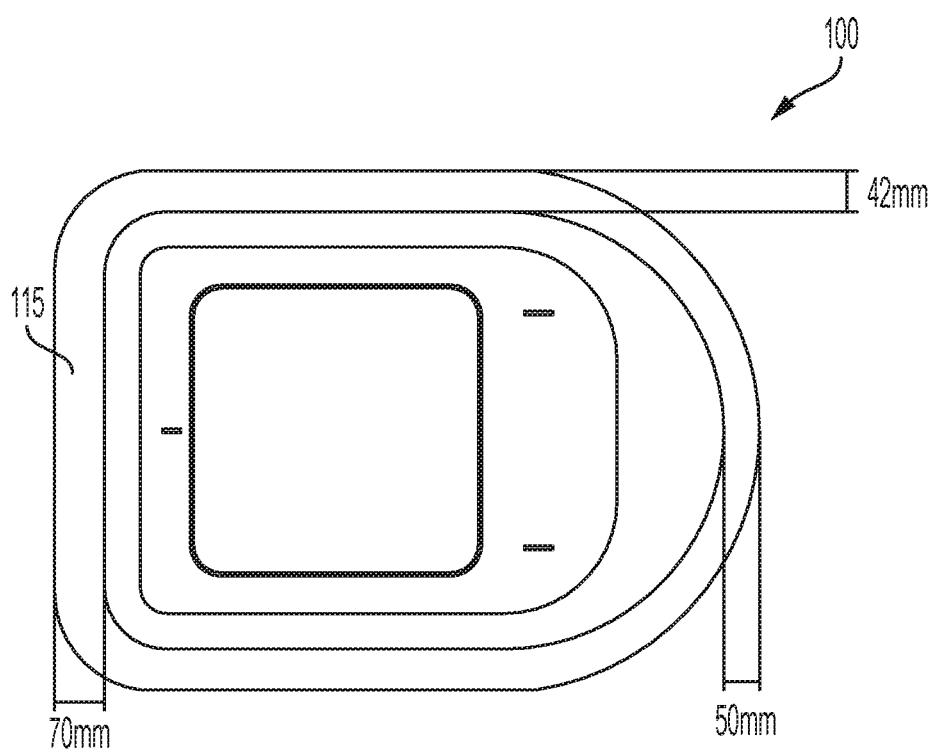
FIG. 11 illustrates the sizing of the horizontal portions of the periphery of the enclosure for accommodating sizing tolerances of commercially available wheelbarrows in accordance with an embodiment.

With reference to FIGS. 6 and 11, the rear horizontal periphery portion 115 may widen to 70 mm at the rear 103 so as to accommodate length variations of commercially available wheelbarrows.

Thereafter, the periphery 140 may be secured to the wheelbarrow by driving fasteners therethrough, such as self tapping plastic screws, bolts or the like. For example, as shown in FIG. 9 fasteners 128 may be driven vertically through the horizontal periphery portion 115 so as to engage vertically through corresponding portions of the edge 126 of the wheelbarrow thereunderneath.

Figure 9:
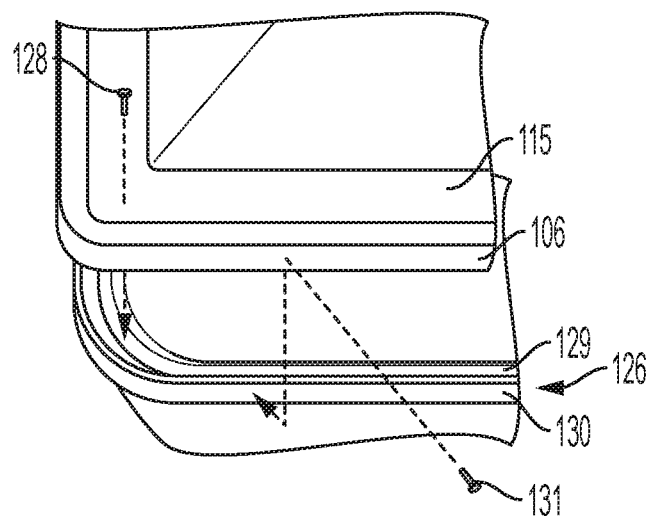
FIG. 9 shows differing manners by which fasteners can be used to secure the periphery of the enclosure to the edge of the wheelbarrow.

As is further illustrated in FIG. 9, some edges of commercially available wheelbarrows comprise a bifold edge defining an inner dome and an outer upwardly rising vertical portion 130. As such, the downward driven fasteners 128 may engage within the inner dome portion 129.

Additionally or alternatively, fasteners 130 may be driven horizontally through the vertical periphery portion 106 so as to engage the adjacent vertical portion 130 of the wheelbarrow edge.

For example, a pair of fasteners may be driven through the periphery 114 at the corners between the rear 103 and sides 124 of the periphery 114 so as to cooperate with the engagement 122 to hold the body 101 atop the wheelbarrow in a semipermanent manner.

The access aperture 107 may be generally rectangular and may be selectively enclosed by way of the lid 108 which, in the preferred embodiment shown, is pivotally attached to the roof 110. Specifically, the plastic body 110 may define lid hinge portions which may comprise a pair of vertical tabs 111 having apertures 112 therethrough which correspond in spacing to pivot arms 122 and corresponding apertures 123 of the lid 108. A hinge pin may be located through the adjacent apertures 102, 112 so as to pivotally engage the pivot arms 122 to the tabs 111 in a pivotable manner such that the lid 108 may pivot thereabout so as to selectively enclose the access aperture 107 when horizontal yet allow access therethrough when raised upwardly.

Opposite the pivot engagements, the body 101 may comprise a locking tab 110 and aperture 117 which may correspond in location with a corresponding locking tab 116 and aperture 117 of the lid 108. When pivoted horizontally, the locking tab 116 of the lid 108 corresponds with the locking tab 116 of the body 101 such that the apertures 117 collocate for the insertion of a padlock or the like therethrough.

The periphery of the access aperture 107 may comprise an inner rim 119 which is surrounded by a corresponding outer rim 121 of the lid 108 in the manner shown in FIG. 3 so as to be substantially water tight in the rain.

The lid 108 may comprise opposite lateral handles 118 for facilitating the lifting of the lid 108 from either side or with both hands. Access under the handles 118 may be facilitated by corresponding adjacent recesses 119 there underneath.

The lid 108 may have a raised centre 120 for structural integrity and greater space thereunderneath.

Exemplary dimensions of the body 101 are provided in FIG. 6 in accordance an embodiment.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of enclosing a wheelbarrow using an enclosure, the enclosure having a plastic body having a dome portion and a wheelbarrow edge engaging periphery portion thereabout, the periphery having a rear, front and sides therebetween, the rear and sides being straight and the front being curved, the dome portion having an access aperture thereatop and a lid for selectively closing the aperture, the enclosure further comprising a downwardly extending engagement at the front of the periphery which further extends rearwardly so as to engage under a front portion of a wheelbarrow edge in use, the method comprising engaging the enclosure under a front edge of the wheelbarrow and lowering the rear of the enclosure across the edge of the wheelbarrow and driving at least one fastener through the periphery into the edge of the wheelbarrow.

2. The method as claimed in claim 1, wherein the dome portion raises from the periphery by more than 150 mm.

3. The method as claimed in claim 1, wherein the periphery comprises a horizontal periphery portion and an outer vertical periphery portion and wherein the engagement extends from the lower edge of the vertical periphery portion.

4. The method as claimed in claim 3, wherein the horizontal periphery portion at a rear of the enclosure has a width greater than 50 mm.

5. The method as claimed in claim 3, wherein the engagement extends vertically downwardly from the lower edge of the vertical periphery portion before transitioning horizontally.

6. The method as claimed in claim 3, wherein a rear edge of the engagement is curved.

7. The method as claimed in claim 1, wherein the periphery comprises a horizontal periphery portion and a vertical periphery portion thereabout.

8. The method as claimed in claim 7, wherein the horizontal periphery portion comprises a width greater than 30 mm.

9. The method as claimed in claim 8, wherein the horizontal periphery portion comprises a rear having a width greater than 50 mm.

10. The method as claimed in claim 1, wherein the dome portion has a planar roof and wherein the access aperture is located through the planar roof.

11. The method as claimed in claim 10, wherein the access aperture is substantially rectangular having a width of greater than 400 mm and a length of greater than 400 mm.

12. The method as claimed in claim 10, wherein the access aperture is located towards a rear of the enclosure and wherein the access aperture is located less than 250 mm from the rear of the enclosure.

13. The method as claimed in claim 12, wherein the access aperture is located less than 200 mm from the rear of the enclosure.

14. The method as claimed in claim 10, wherein the lid is pivotally engaged to the roof.

15. The method as claimed in claim 14, wherein the enclosure further comprises a rim, the rim comprises a pair of tabs having apertures which correspond with pivot arms and corresponding apertures of the lid for pivotable engagement of the lid to the roof.

16. The method as claimed in claim 15, wherein the tabs are located in front of the access aperture.

17. The method as claimed in claim 15, wherein the rear further comprises a locking tab and aperture corresponding to a locking tab and aperture of the lid for the insertion of a lock therethrough in use.

18. The method as claimed in claim 1, wherein the access aperture has a peripheral inner upwardly extending rim thereabout and wherein the lid defines a corresponding outer downwardly extending rim.

\* \* \* \* \*